March 3, 1959
C. CHEDISTER
2,875,667
CONTINUOUS FEED ATTACHMENT
Filed Feb. 19, 1952
3 Sheets-Sheet 1
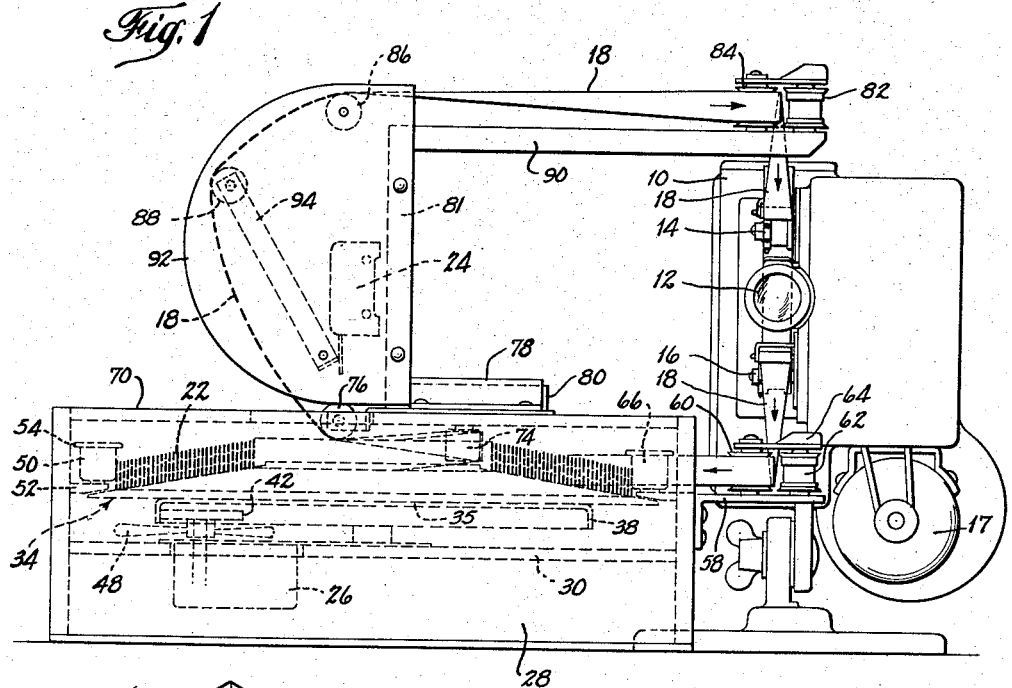
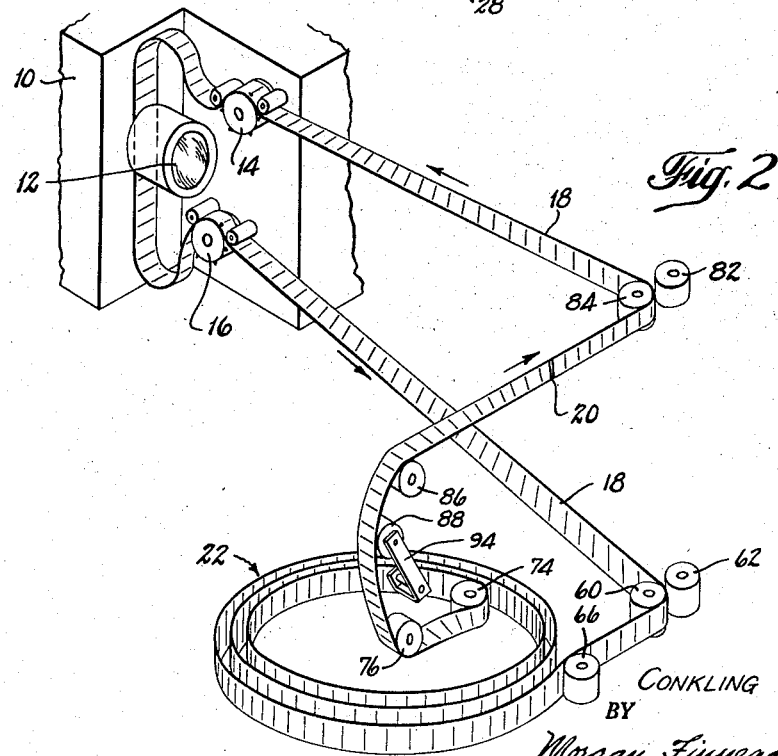
INVENTOR.
CONKLING CHEDISTER
BY
Morgan, Finnegan + Durham
ATTORNEYS.

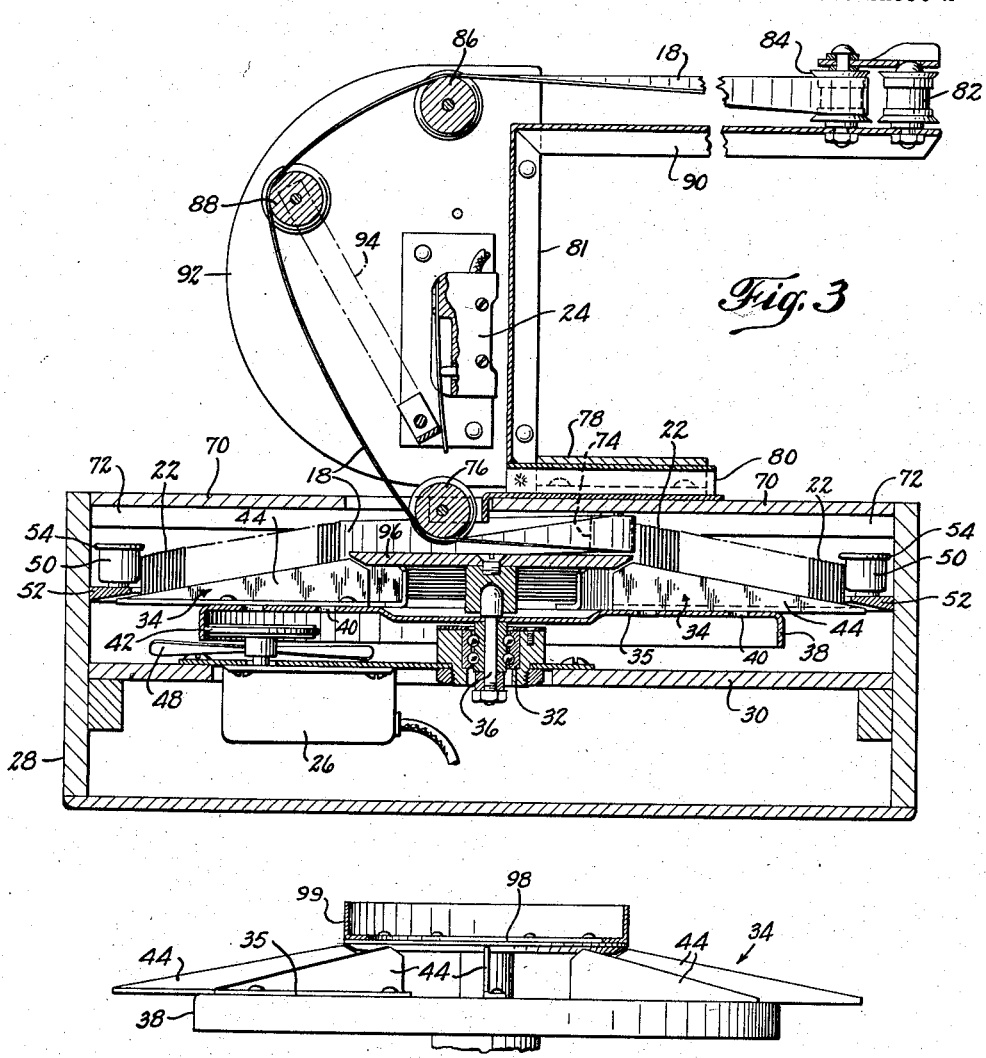

March 3, 1959   C. CHEDISTER   2,875,667
CONTINUOUS FEED ATTACHMENT
Filed Feb. 19, 1952   3 Sheets-Sheet 3
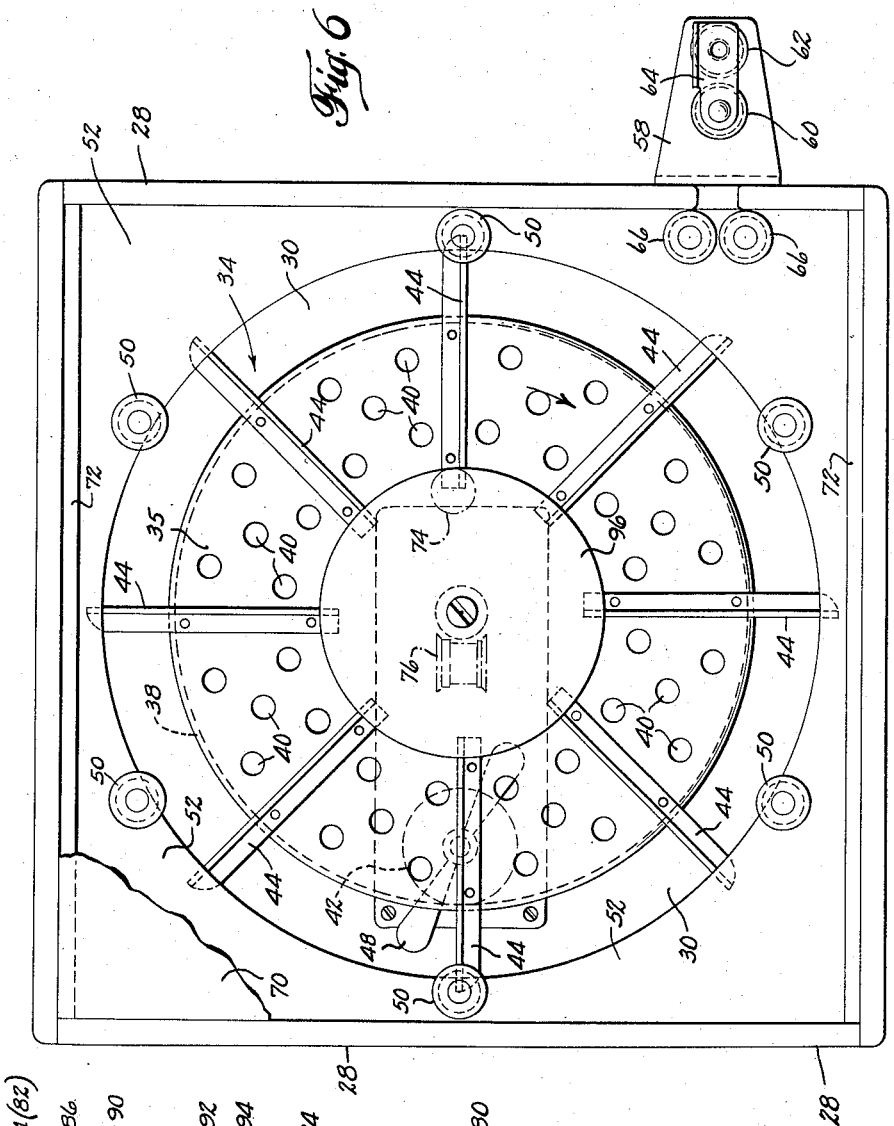
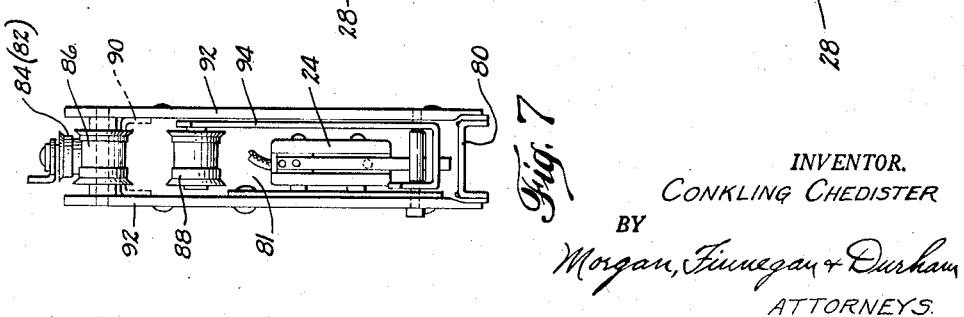
INVENTOR.
CONKLING CHEDISTER
BY
Morgan, Finnegan & Durham
ATTORNEYS.

United States Patent Office 2,875,667
Patented Mar. 3, 1959

2,875,667
CONTINUOUS FEED ATTACHMENT

Conkling Chedister, Livingston, N. J.

Application February 19, 1952, Serial No. 272,489

7 Claims. (Cl. 88—18.7)

The present invention relates to a novel and improved continuous feed mechanism especially adapted for handling an endless length of motion picture film as it is projected.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof illustrate one embodiment of the invention, and together with the description, serve to explain the principles of the invention.

Of the drawings:

Figure 1 is a front elevation of the present preferred and illustrative embodiment of the invention showing its relation to a motion picture projector;

Figure 2 is a schematic diagram in perspective showing the path of the film and certain of the guide rollers as the film is fed to the projector, projected, led away from the projector and rewound ready to be once again projected;

Figure 3 is a vertical sectional view of the continuous film attachment;

Figure 4 is a fragmentary view showing certain of the parts with a removable core on which the film is wound during the initial winding operation;

Figure 5 is a wiring diagram showing the electrical connections as employed in the preferred embodiment;

Figure 6 is a top plan view of the continuous attachment, as shown in Figure 3, with the upper members broken away and removed but with certain of them being shown in dotted lines; and Figure 7 is a side elevation showing in detail the support arm and switch mechanism forming part of the continuous attachment.

The present invention has for its object the provision of a novel and improved continuous feed magazine for motion picture film to be projected by which a loop of film of a few or a few hundred feet in length may be projected repeatedly without the necessity of stopping the projector for rewinding of the film. A further object is the provision of a continuous magazine which causes much less wear on the film and maintains the film in much better condition than has been the case with prior continuous film magazines. Still another object is the provision of a continuous film magazine which can be easily attached to or detached from a motion picture projector without requiring any structural change in the projector, and can be used with almost any motion picture projector. Still another object is the provision of a continuous film magazine for motion picture projectors which avoids cinching of the film and which provides automatically controlled power feeding means for the film so that the power required for rewinding of the film and the feeding of the film from a rewound mass to the projector is not applied to the film either at its perforations nor on the face of the film, thereby avoiding excessive wear and damage to the film. The invention further provides a continuous film feeding mechanism in which the film is fed from the interior of a coil of film and is continuously rewound onto the coil at the exterior of the coil, while intermittently operating motor means controlled by the film being fed from the coil supplies the power needed to rotate the coil of film, to wind the film onto the coil and then feed the film from the coil.

In accordance with the present preferred and illustrative embodiment of the invention, there is provided a conventional form of motion picture projector which is adapted to project intermittently the successive images of a motion picture film while the film is fed to and from the projecting position by means of continuously driven sprockets. The film is formed into a loop (with the ends of the film strip spliced together) the main body of film being formed into a large coil which is preferably conical in shape, the film being fed from the interior of the coil to the projector and being returned to the coil and rewound on the exterior of the coil. Means are provided for supporting the conical coil of film and motor means are also provided for rotating the supporting means at a speed which is slightly more than is needed to take up the film being returned to the coil. The film being fed from the coil to the projector preferably controls the running of the motor so that as the film is fed out from the coil to the projector the motor runs unless the film between the coil and the infeeding roller of the projector has formed too large a loop, or unless the film between the outfeed roller and the coil becomes sufficiently tight to stall the low powered motor by which the film coil is driven. The motor is preferably a low power electric motor having a high starting torque and is controlled by a switch actuated by the size of the loop between the coil and the infeed roller, while the film is preferably supported on an upwardly pointing conical support which may be a perforated member or a spider having radial arms, while the motor is preferably positioned below the support and in driving relation thereto, and is provided with a fan not only to keep the motor cool but also to dissipate some of the heat from the film as the hot, just-projected film is returned to the coil. The upwardly directed conical support also serves to maintain the diameter of the coil which would otherwise diminish as film was fed from it, and further serves to assist in preventing wrinkling or curling of the film. Due to the relative stiffness of a short length of film, after the film feeding operation has been continued for a few seconds, and has reached a condition of equilibrium, the film fed to the projector is actually pushed from the coil upwardly and almost floats to the infeeding roller of the projector so that the uneven running of the film is minimized and at no time is there any excessive load placed on the feeding perforations at the edges of the film.

As preferably embodied, the film magazine is a separate unit which is controlled by the projector but has no mechanical connection therewith aside from the film which is fed to and from the projector. Where an electric motor is used to drive the coiled mass of film, the continuous magazine attachment can be positioned at any convenient location, to the side of, above, or below the projector, and can be readily attached to or detached from any standard projector without mechanical modification of the projector, although the usual film reel supporting arms may be detached, as they are not needed.

It will be understood that the foregoing general description and the following detailed description as well are exemplary and explanatory of the invention but are not restrictive thereof.

Referring now in detail to the accompanying drawings, which illustrate a preferred and typical embodiment of the present invention, the continuous magazine is shown as adapted for use with a relatively large quantity of 16 mm. motion picture film, as much as 800 or 1000 feet being adapted to be received by the magazine, although much smaller quantities such as twenty or thirty feet might be formed as the loop, if such a small quantity of film were desired.

The motion picture projector comprises a conventional motion picture projector having a lamp house 10, a projection lens 12 in front of the projection position of the projector, while film is fed to and away from the projection position by means of the infeeding and outfeeding sprocket rollers 14 and 16, respectively, the film being fed intermittently past projection position by means of the usual intermittent feed mechanism, not shown, driven from the projector motor 17. The film 18, of whatever length desired, is formed into an endless loop by having its ends spliced together, as at 20, while the main mass of film is coiled into a conical mass 22, so that the film is fed to the coiled mass at the outer portion of the mass, and is fed from the coiled mass at the interior thereof. As the film passes from the coiled mass to the projector, it is led upwardly and forms a slight loop, in which is positioned a switch 24 or other means for controlling the action of a motor 26 which tends to drive the main mass of the film 22 at a peripheral speed slightly in excess of the speed needed to take up the film fed from the projector. The motor 26 also controls the feeding of the film from the coiled mass and thereby delivers the film 18 so that the maximum pull ordinarily exerted on the film by the infeeding roller 14 is the force needed to pull the film from the switch 24 to the infeeding roller 14.

The continuous film magazine is preferably supported in a box-like casing 28 having a cross frame member 30 on which is supported a bearing 32 by which the film mass supporting member or spider 34 is rotatably mounted by means of its shaft 36. The cross frame 30 also serves as a support for the small motor 26 by which the film support 34 is driven. Motor 26 preferably comprises a small A. C. induction motor having good starting torque and adapted to develop sufficient power to pull the film onto the film mass, but not sufficient power to exert a strong pull on the film, even when the motor is stalled by reason of its tending to run faster than the rate at which the film is fed to the mass 22. The supporting member or spider 34 preferably comprises a circular disc 35 having a downwardly turned edge 38, the disc being fast to the shaft 36 by which it is rotatably supported, and is preferably perforated, as at 40. Motor 26 drives a small friction wheel 42, mounted on the rotor shaft of the motor and held in contact with the inner face of the turned edge 38. The diameters of the friction wheel 42 and the edge portion 38 and the speed of motor 26 are so related that there is slight tendency on the part of the motor to drive the support member 34 slightly faster than is necessary to take up the film fed to it.

Supporting member 34 is preferably formed as a plurality of inclined radial ribs 44, sloping downwardly and outwardly and securely fastened to the disc-like member 36. Such spoke-like ribs 44 are preferable to a continuous surface as they provide for additional air circulation over the film and provide a more positive drive than is provided by a normally smooth conical surface which may be engaged by the film at any point. The ventilating feature is of great importance in keeping the film cool, thereby assisting in preserving the film, and this cooling effect may be increased by providing a small fan blade 48 on the shaft of the motor 26.

The conical development of the ribs 44 is also of benefit in maintaining the film 18 against curling and wrinkling, as it tends to keep each involute layer of film parallel to the axis and resists any tendency of the film to warp. Furthermore, the conical shape spreads the film and maintains the looped mass of film at as large a diameter as is needed, thereby freeing the successive layers from each other and allowing the inner layer to feed off easily and without any danger of cinching the several layers.

For confining the generally circular mass of film 22, a plurality of small guide rollers 50 are provided which are mounted for free and independent rotation on brackets 52 so they are equidistant from the shaft 36 and are adapted to contact with the outermost layer of film in the mass 22. Each roller 50 is preferably formed with an upper rim 54 which serves to hold the mass of film down against the supporting member 34 and also insures that the on fed layer of film is correctly positioned.

For guiding the film from the projector to the continuous magazine, guide rollers are provided, and as embodied, a bracket 58 extends from the casing 28, and on it are supported the freely rotatable parallel rollers 60 and 62. Roller 60 is a guide roller, while roller 62 is a roller to assist in holding the film in position and correctly feeding it to the roller 60. On top of the two rollers 60 and 62 is a guard member 64 which is pivoted and frictionally held in position so that the film 18 cannot jump out from between the rollers. The rollers 60 and 62 allow the film to be fed from either side around roller 60 between the rollers 66 after which the film is laid on the mass of film 22. Rollers 50, 60, 62 and 66 are all preferably alined with each other and parallel.

In use, the casing 28 is closed at its top by means of a removable transparent plate 70 on which various guide rollers are supported. As embodied, the plate 70 is retained in the casing 28 by the side rails 72 and the sides of the casing 28, and is suitably apertured to provide for ventilation of the interior of the casing. On the underside of the casing is supported a guide roller 74 which is freely rotatable and is adapted to guide the film 18 as it leaves the coiled mass 22 and is fed towards the projector. As the film leaves roller 74 it is turned one-quarter turn and is fed to a freely rotatable guide roller 76 set at right angles to the roller 74 and mounted on the plate 70 at a slot therein.

Plate 70 also supports the guide rollers and switch means by which the feeding of the film to the projector is controlled. As embodied, a guideway is provided on the upper surface of plate 70 by means of the rectangular channel 78 into which fits the lower leg 80 of the support 81 for the upper guide rollers 82, 84 and 86 and the pilot roller 88. On the upper leg 90 of support 81 are mounted a pair of guide rollers 82, 84 between which the film is guided to the infeed roller 14 of the projector. Support 81 also supports a pair of plates 92 between which is rotatably mounted a guide roller 86, parallel to roller 76, and an arm 94 which support a freely rotatable pilot roller 88, roller 88 being resiliently urged towards a position where it tends to enlarge the length of film between the rollers 86 and 76. Also mounted between the plates 92 is a normally open switch 24 which is adapted to be closed against the pressure of a light spring by movement of the roller 88 and its supporting arms 94 as it is moved by faster feeding of the film 18. When the film is fed from the mass too slowly, switch 24 closes, while if the film is fed too fast the switch 24 is opened to stop the feed of the film.

Centrally of the supporting meber 34 is positioned a slightly raised circular member 96, normally supported on the upper end of shaft 36, the outer edge of the member 96 serving to limit the minimum diameter of the interior of the coiled mass 22 of the film.

Figure 4 illustrates a removable core member 98 which is helpful in correctly forming the film 18 into the coiled mass 22. Member 96 is removed from the shaft 36 and the core member 98 is substituted therefor. It differs from the member 96 in that it has an upstanding periphery 99 which corresponds to the minimum interior space which should be left at the center of the film mass 22. As soon as the mass has been formed with a new loop of film, the member 98 is removed and replaced with the member 96.

Figure 5 illustrates the connections of the various electrical parts of the preferred embodiment. As shown, current is supplied from the mains to the projector motor 17, and is supplied to the continuous magazine motor 26 under control of the switch 24, both motors being controlled by the master switch 100.

The invention in its broader aspects is not limited to the specific mechanisms shown and described but departures may be made therefrom within the scope of the accompanying claims without departing from the principles of the invention and without sacrificing its chief advantages.

What is claimed is:

1. A continuous film feeding attachment comprising a rotary member to support a coiled mass of film to rotate about a vertical axis, the film being wound thereon on the outermost layer and fed from the innermost layer, and intermittently operating motor means controlled by the tension of the film fed from the mass of film to the projector for rotating the rotary member and the film supported thereon, whereby the film fed to the projector is relieved from any force needed to rotate the mass of film said motor means comprising a low power electric motor adapted to stall when the tension on the film coming from the projector exceeds a certain value.

2. A continuous film feeding attachment as claimed in claim 1, in which the rotary member comprises a plurality of outwardly and downwardly inclined radial ribs fixed relatively to each other.

3. A continuous film feeding attachment as claimed in claim 1 in which the torque of the motor is very slightly more than is required normally to rotate the coil of film and to draw the onfed film onto the mass and tends to operate at a slight overspeed.

4. A continuous film magazine to be used with a motion picture projector and comprising a rotary support for a coiled mass of looped film fed to and from the projector, a low power, readily stallable, electric motor for driving said rotary support the torque of said motor only slightly exceeding the power required to rotate the mass of film, and means controlled by the film fed from the support to the projector for controlling the supply of power to said motor being adapted to stall when the tension on the film coming from the projector exceeds a certain value.

5. In a continuous film magazine, the combination of means for rotatably supporting a coiled mass of film, a casing enclosing the supporting means and film, a fan driven by the motor, said casing being perforated and the fan being positioned below and eccentrically of the coiled mass of film whereby air is circulated across the rotating mass of film for cooling the film.

6. A motion picture projection attachment for feeding a continuous loop of film to and from the projector, including in combination a casing, an air pervious rotary member, for supporting a coiled mass of film, means by which film is wound on the outermost layer while it is fed from the innermost layer, motor means for driving the rotary member about a vertical axis, said motor being provided with a fan directly below the coiled mass of film and eccentric thereto, to circulate air over the film coil, and means controlled by the normal tension of the film fed from the coiled mass to the projector for starting and stopping the supply of power to the motor.

7. A continuous film feeding attachment comprising a rotary member to support a coiled mass of film to rotate about a vertical axis, the film being wound thereon on the outermost layer and fed from the innermost layer, intermittently operating motor means controlled by the tension of the film fed from the mass of film to the projector for rotating the rotary member and the film supported thereon, whereby the film fed to the projector is relieved from any force needed to rotate the mass of film, a plate supported above the rotary member provided with a channel, a support bracket slidably fitted in the channel, said bracket including guide rollers by which the film is fed from the coiled mass to a projector, and a pilot roller controlling the operation of the motor, said pilot roller controlling a switch in the motor circuit.

References Cited in the file of this patent

UNITED STATES PATENTS

| | | |
|---|---|---|
| 2,037,601 | Shirlow | Apr. 14, 1936 |
| 2,303,633 | Guercio | Dec. 1, 1942 |
| 2,338,421 | Fries | Jan. 4, 1944 |
| 2,363,627 | Schalie | Nov. 28, 1944 |
| 2,398,639 | Heyer | Apr. 16, 1946 |
| 2,436,032 | Bendfelt | Feb. 17, 1948 |
| 2,526,377 | London | Oct. 17, 1950 |
| 2,530,936 | Bohl | Nov. 21, 1950 |
| 2,546,124 | Hart | Mar. 20, 1951 |

FOREIGN PATENTS

| | | |
|---|---|---|
| 321,551 | Germany | June 7, 1920 |